United States Patent
Rakshit et al.

(10) Patent No.: US 12,536,931 B2
(45) Date of Patent: Jan. 27, 2026

(54) DYNAMIC CORRECTION OF HOLOGRAPHIC CONTENT TO BE DISPLAYED ON A FOLDABLE MOBILE DEVICE

(71) Applicant: INTERNATIONAL BUSINESS MACHINES CORPORATION, Armonk, NY (US)

(72) Inventors: Sarbajit K. Rakshit, Kolkata (IN); Sathya Santhar, Ramapuram (IN); Samuel Mathew Jawaharlal, Chennai (IN); Sridevi Kannan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 17/931,173

(22) Filed: Sep. 12, 2022

(65) Prior Publication Data
US 2024/0087490 A1    Mar. 14, 2024

(51) Int. Cl.
*G09G 3/00* (2006.01)
*G06N 3/045* (2023.01)
(Continued)

(52) U.S. Cl.
CPC ............ *G09G 3/003* (2013.01); *G06N 3/045* (2023.01); *G06N 3/08* (2013.01); *G06T 3/02* (2024.01);
(Continued)

(58) Field of Classification Search
CPC . G06T 3/02; G06T 3/20; G09G 3/035; G09G 2340/0464; G09G 2340/12
See application file for complete search history.

(56) References Cited

U.S. PATENT DOCUMENTS

| | | |
|---|---|---|
| 8,154,780 B2 | 4/2012 | Cable |
| 10,558,277 B2 | 2/2020 | Henell |

(Continued)

FOREIGN PATENT DOCUMENTS

| | | |
|---|---|---|
| CN | 104750449 B | 11/2018 |
| EP | 3345077 B1 | 7/2021 |

OTHER PUBLICATIONS

Ackerman, "HoloFlex: A Flexible Smartphone with a Holographic Display," IEEE Spectrum, May 5, 2016, [accessed Jul. 22, 2022], 14 pgs., Retrieved from the Internet: <https://cacm.acm.org/news/202202-holoflex-a-flexible-smartphone-with-a-holographic-display/fulltext>.

(Continued)

*Primary Examiner* — Grace Q Li
(74) *Attorney, Agent, or Firm* — James L. Olsen

(57) ABSTRACT

A method, computer program, and computer system are provided for correcting holographic content to be displayed on a foldable mobile device. The method, computer program, and computer system may include identifying holographic content to be displayed on two display regions of a foldable mobile device. An angle between the two display regions of the foldable mobile device is calculated, and a determination is made as to whether the holographic content on each of the two display regions overlaps based on the calculated angle. The holographic content to be displayed is updated based on applying one or more geometric transformations to the holographic content corresponding to determining the holographic content overlaps, and the updated holographic content is displayed as a three-dimensional holographic image.

20 Claims, 8 Drawing Sheets

(51) Int. Cl.
    *G06N 3/08*          (2023.01)
    *G06T 3/02*          (2024.01)
    *G06T 3/20*          (2006.01)

(52) U.S. Cl.
    CPC ............... *G06T 3/20* (2013.01); *G09G 3/035* (2020.08); *G09G 2340/0464* (2013.01); *G09G 2340/12* (2013.01)

(56) References Cited

U.S. PATENT DOCUMENTS

| | | |
|---|---|---|
| 2012/0313862 A1 | 12/2012 | Ko |
| 2017/0371298 A1* | 12/2017 | Murphy ............... G03H 1/2202 |
| 2018/0039339 A1 | 2/2018 | Henell |
| 2023/0007116 A1* | 1/2023 | Sung ................... H04M 1/0214 |

OTHER PUBLICATIONS

Deynai, "Screen Incorrectly Detects Folding State," Microsoft, Apr. 27, 2021, [accessed Jul. 22, 2022], 3 pgs., Retrieved from the Internet: <https://answers.microsoft.com/en-us/surface/forum/all/screen-incorrectly-detects-folding-state/254f6d9c-1e19-4b8e-ac66-1a9ac13ca344>.

Diaz, "Samsung Invents a Galaxy Phone Dock With a Holographic Display," Tom's Guide, Oct. 2, 2019, [accessed Jul. 22, 2022], 13 pgs., Retrieved from the Internet: <https://www.tomsguide.com/news/samsung-invents-a-galaxy-phone-dock-with-a-holographic-display>.

Disclosed Anonymously, "Method for Automatically Adjusting Size and Position of Holographic Objects in Foldable Display Devices," IP.com Prior Art Database Technical Disclosure, IPCOM000255846D, Oct. 16, 2018, 3 pgs.

Khan, et al., "GAN-Holo: Generative Adversarial Networks-Based Generated Holography Using Deep Learning," Hindawi, Complexity, vol. 2021, Article ID 6662161, Wiley, Jan. 21, 2021, 7 pgs.

Park, et al., "Distortion Compensation of Reconstructed Hologram Image in Digital Holographic Display Based on Viewing Window," ETRI Journal, vol. 39, No. 4, Aug. 2017.

Rutnik, "The Best Foldable Phones You Can Get," Android Authority, Jul. 1, 2022, [accessed Jul. 22, 2022], 16 pgs., Retrieved from the Internet: <https://www.androidauthority.com/best-foldable-phones-922793/>.

Shankland, "Holographic Leia Lives in Red's New Phone (Not the Princess)," CNET, Sep. 8, 2017, [accessed Jul. 22, 2022], 7 pgs., Retrieved from the Internet: <https://www.cnet.com/tech/mobile/reds-3d-holographic-hydrogen-one-phone-powered-by-leia/>.

\* cited by examiner

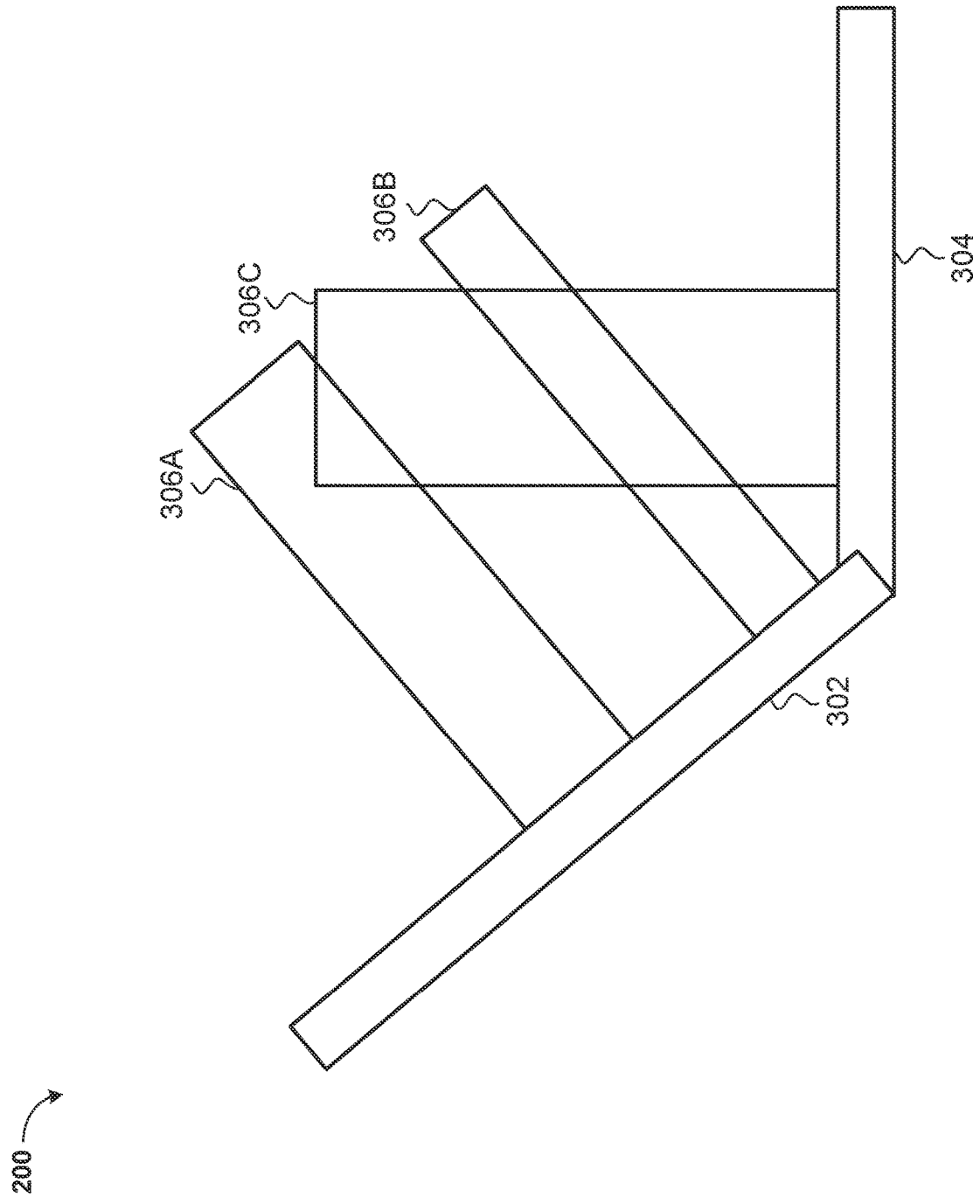

DYNAMIC CORRECTION OF HOLOGRAPHIC CONTENT TO BE DISPLAYED ON A FOLDABLE MOBILE DEVICE

FIELD

This disclosure relates generally to field of display technology, and more particularly to holographic displays.

BACKGROUND

A holographic display is a type of display that utilizes light diffraction to create a virtual three-dimensional image. Holographic displays are distinguished from other forms of 3D displays in that they do not require the aid of any special glasses or external equipment for a viewer to see the image.

SUMMARY

Embodiments relate to a method, system, and computer readable medium for correcting holographic content to be displayed on a foldable mobile device. According to one aspect, a method for correcting holographic content to be displayed on a foldable mobile device is provided. The method may include identifying holographic content to be displayed on two display regions of a foldable mobile device. An angle between the two display regions of the foldable mobile device is calculated, and a determination is made as to whether the holographic content on each of the two display regions overlaps based on the calculated angle. The holographic content to be displayed is updated based on applying one or more geometric transformations to the holographic content corresponding to determining the holographic content overlaps, and the updated holographic content is displayed as a three-dimensional holographic image.

According to another aspect, a computer system for correcting holographic content to be displayed on a foldable mobile device is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying holographic content to be displayed on two display regions of a foldable mobile device. An angle between the two display regions of the foldable mobile device is calculated, and a determination is made as to whether the holographic content on each of the two display regions overlaps based on the calculated angle. The holographic content to be displayed is updated based on applying one or more geometric transformations to the holographic content corresponding to determining the holographic content overlaps, and the updated holographic content is displayed as a three-dimensional holographic image.

According to yet another aspect, a computer readable medium for correcting holographic content to be displayed on a foldable mobile device is provided. The computer readable medium may include one or more computer-readable storage devices and program instructions stored on at least one of the one or more tangible storage devices, the program instructions executable by a processor. The program instructions are executable by a processor for performing a method that may accordingly include identifying holographic content to be displayed on two display regions of a foldable mobile device. An angle between the two display regions of the foldable mobile device is calculated, and a determination is made as to whether the holographic content on each of the two display regions overlaps based on the calculated angle. The holographic content to be displayed is updated based on applying one or more geometric transformations to the holographic content corresponding to determining the holographic content overlaps, and the updated holographic content is displayed as a three-dimensional holographic image.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 3B is a diagram of holographic content on a folded foldable display prior to correction, according to at least one embodiment;

DETAILED DESCRIPTION

Figure 1:
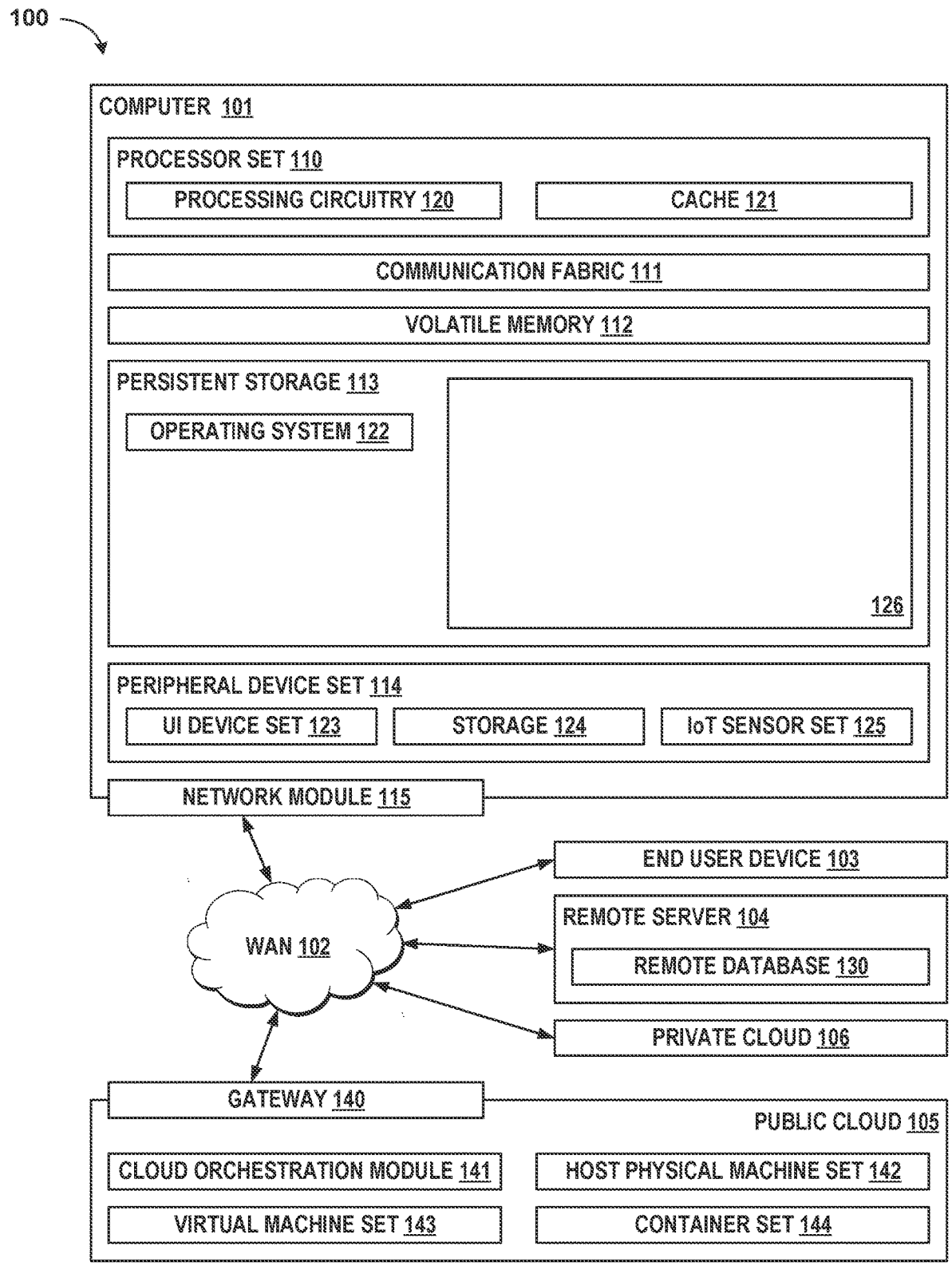
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of display technology, and more particularly to holographic displays. The following described exemplary embodiments provide a system, method, and computer program to, among other things, correct holographic content to be displayed on a foldable mobile device. Therefore, some embodiments have the capacity to improve the field of computing by allowing for proper display of holographic content when the foldable mobile device is folded.

As previously described, a holographic display is a type of display that utilizes light diffraction to create a virtual three-dimensional image. Holographic displays are distinguished from other forms of 3D displays in that they do not require the aid of any special glasses or external equipment for a viewer to see the image. Mobile devices, such as smartphones, increasingly include capabilities to create mid-air holographic objects through holographic projectors installed in the mobile device. These projectors can project holographic objects in mid-air above the surface of the mobile device to create a three-dimensional (3D) view of the displayed contents.

Foldable display devices are also becoming increasingly available. The same content can be displayed on two folded portion of the display or different content can also be shown on the folded portions. Such foldable devices may include a holographic module that can read image metadata and can create holographic mid-air 3D objects based on the image metadata. However, if the foldable mobile device includes mid-air holographic projection capabilities, 3D holographic objects created on different folded portions may intersect one another if the angle between the portions is changes. Thus, the complete 3D holographic image will be distorted. It may be advantageous, therefore, to determine whether the display regions of the foldable display device are at an angle with respect to one another in order to determine whether the holographic content display by each region may be overlapped and to correct such overlaps.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method and computer program that corrects holographic content to be displayed on a foldable mobile device. Referring now to FIG. 1, Computing environment 100 contains an example of an environment for the execution of at least some of the computer code involved in performing the inventive methods, such as Holographic Image Correction 126. In addition to Holographic Image Correction 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Holographic Image Correction 126, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Holographic Image Correction 126 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Holographic Image Correction 126 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
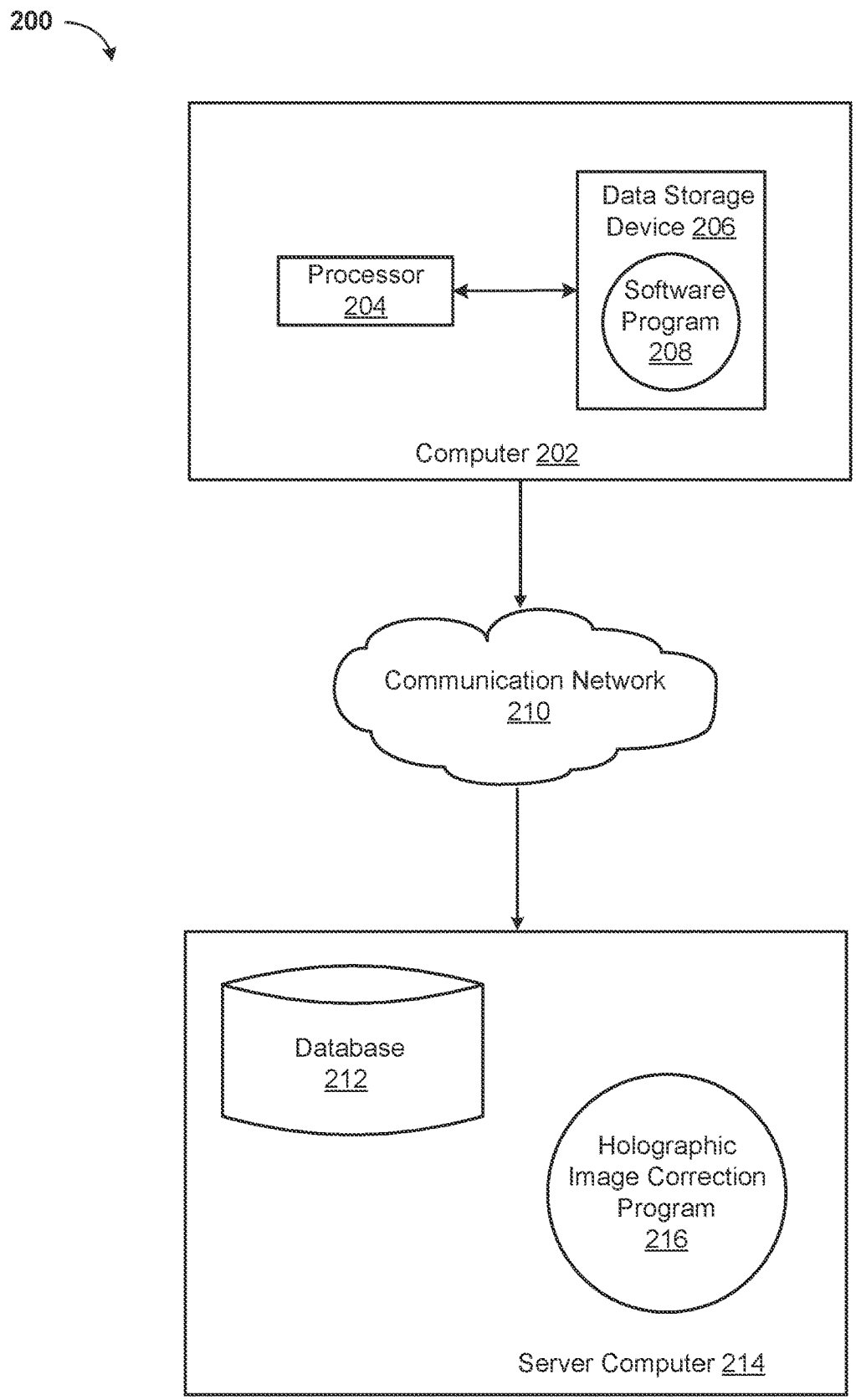
FIG. 2 illustrates a networked computer environment according to at least one embodiment.

Referring now to FIG. 2, a functional block diagram of a networked computer environment illustrating a system 200 (hereinafter "system") for correcting holographic content to be displayed by a foldable mobile device. It should be appreciated that FIG. 2 provides only an illustration of one implementation and does not imply any limitations with regard to the environments in which different embodiments may be implemented. Many modifications to the depicted environments may be made based on design and implementation requirements.

The system 200 may include a computer 202 and a server computer 214. The computer 202 may communicate with the server computer 214 via a communication network 210 (hereinafter "network"). The computer 202 may include a processor 204 and a software program 208 that is stored on a data storage device 206 and is enabled to interface with a user and communicate with the server computer 214. As will be discussed below with reference to FIG. 5, the computer 202 may include internal components 800A and external components 900A, respectively, and the server computer 214 may include internal components 800B and external components 900B, respectively. The computer 202 may be, for example, a mobile device, a telephone, a personal digital assistant, a netbook, a laptop computer, a tablet computer, a desktop computer, or any type of computing devices capable of running a program, accessing a network, and accessing a database.

The server computer 214, which may be used for correcting holographic content to be displayed by a foldable mobile device is enabled to run a Holographic Image Correction Program 216 (hereinafter "program") that may interact with a database 212. The Holographic Image Correction Program is explained in more detail below with respect to FIG. 5. In one embodiment, the computer 202 may operate as an input device including a user interface while the program 216 may run primarily on server computer 214. In an alternative embodiment, the program 216 may run primarily on one or more computers 202 while the server computer 214 may be used for processing and storage of data used by the program 216. It should be noted that the program 216 may be a standalone program or may be integrated into a larger holographic image correction program.

It should be noted, however, that processing for the program 216 may, in some instances be shared amongst the computers 202 and the server computers 214 in any ratio. In another embodiment, the program 216 may operate on more than one computer, server computer, or some combination of computers and server computers, for example, a plurality of computers 202 communicating across the network 210 with a single server computer 214. In another embodiment, for example, the program 216 may operate on a plurality of server computers 214 communicating across the network 210 with a plurality of client computers. Alternatively, the program may operate on a network server communicating across the network with a server and a plurality of client computers.

The network 210 may include wired connections, wireless connections, fiber optic connections, or some combination thereof. In general, the network 210 can be any combination of connections and protocols that will support communications between the computer 202 and the server computer 214. The network 210 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a private network, an ad hoc network, an intranet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3A:
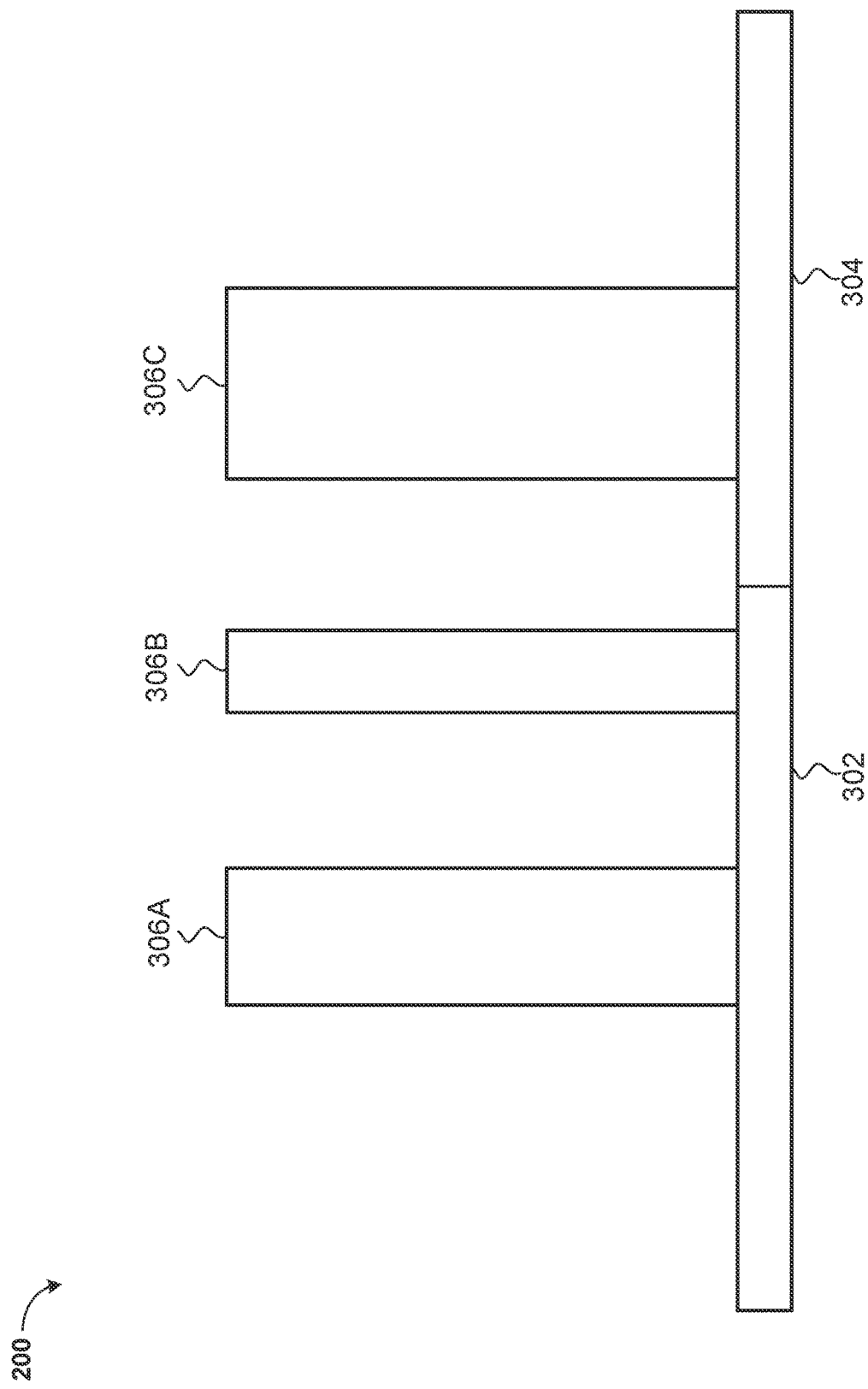
FIG. 3A is a diagram of holographic content on an unfolded foldable display, according to at least one embodiment.

Referring now to FIG. 3A, a view 300A of a foldable mobile device is depicted. View 300A shows the foldable mobile device in an unfolded configuration. The foldable mobile device may have two display regions 302 and 304. The display regions 302 and 304 may be used to display holographic content 306A-C. The holographic content 306A-C may correspond to mid-air 3D holographic objects that are to are displayed.

Referring now to FIG. 3B, a view 300B of a foldable mobile device is depicted. View 300B shows the foldable mobile device in a folded configuration such that the display regions 302 and 304 may be at an angle with respect to one another. View 300B depicts the foldable mobile device prior to correction of display of the holographic content 306A-C. Thus, it may be appreciated that due to the angle between the display regions 302 and 304, the holographic content 306A-C may overlap.

Figure 3C:
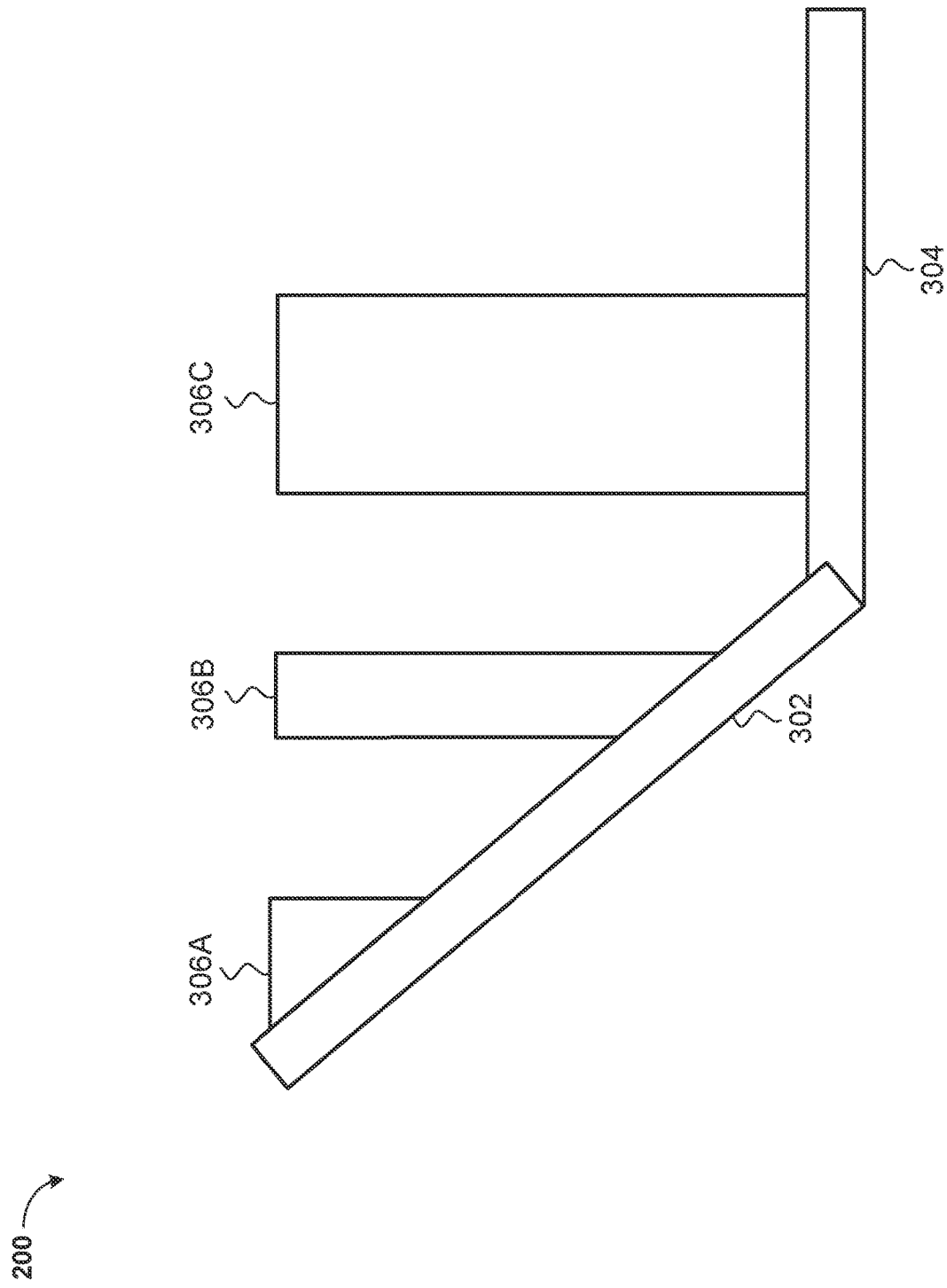
FIG. 3C is a diagram of holographic content on a folded foldable display after correction, according to at least one embodiment.

Referring now to FIG. 3C, a view 300C of a foldable mobile device is depicted. View 300C shows the foldable mobile device in a folded configuration after correction of the holographic content 306A-C to adjust for the angle between the display regions 302 and 304. Sensors (e.g., accelerometers) installed in the display regions 302 and 304 of the foldable mobile device may determine the angle between the display regions 302 and 304. The sensors may also determine whether the holographic content 306A-C overlap (i.e., whether the holographic content 306A-C are converged with one another or other mid-air holographic objects). Accordingly, the foldable mobile device may use a generative adversarial network (GAN) to re-adjust the holographic content 306A-C so that the overlap of the holographic content 306A-C can be prevented. The GAN will be described in further detail in FIG. 4.

It may be appreciated in addition to correcting 3D holographic content to be displayed on a foldable mobile device, the method, computer system, and computer program described herein may be used to correct 3D holographic content to be displayed on a flexible mobile device or to correct 3D holographic content displayed on a mobile device having a cracked screen.

Figure 4:
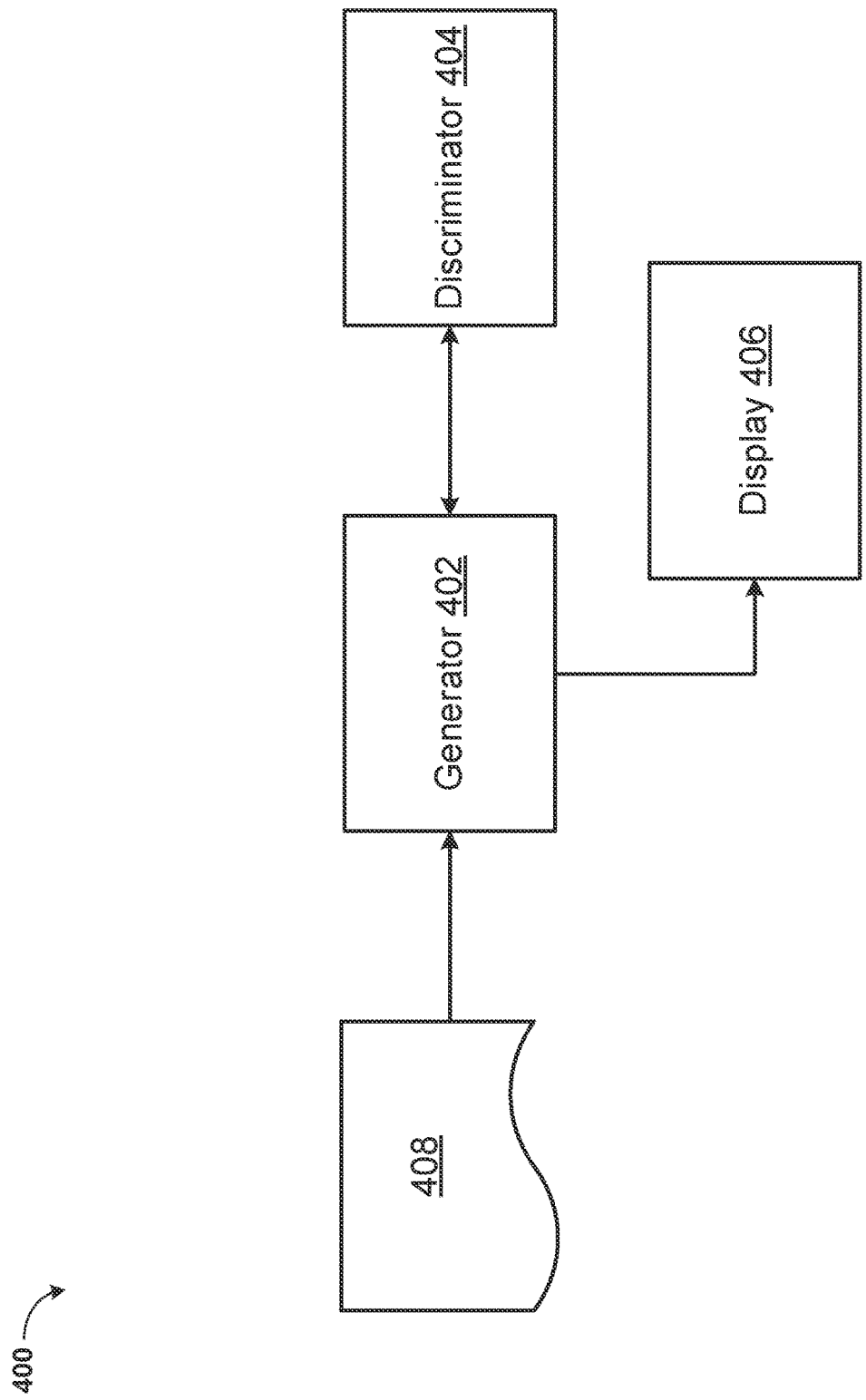
FIG. 4 is a block diagram of a generative adversarial network for correcting holographic content to be displayed on a foldable mobile device, according to at least one embodiment

Referring now to FIG. 4, a block diagram of a generative adversarial network (GAN) 400 is depicted according to one or more embodiments. The generative adversarial network 400 may include, among other things, a generator 402, a discriminator 404, and a display device 406. Based on the folding angle of the foldable mobile device depicted in FIGS. 3A-3C, the generative adversarial network 400 may identify how the impacted holographic content 306A-C (FIG. 3) may be angularly re-positioned and the dimensions adjusted so that, based on the viewing direction and the folding angle of the foldable mobile device, the holographic content 306A-C may be displayed in the same or similar viewing context. The discriminator 404 may be used to train the generator 202 in an adversarial manner.

The generator 402 may receive data 408 as input. The data 408 may correspond to the holographic content 306A-C (FIGS. 3A-3C). The generator 402 may be trained to perform dynamic correction of holographic 3D content displayed on a foldable device. The generator 402 may determine, based on the folding angle and viewing direction of a user of the foldable mobile device, a number of objects are to be displayed, a number of objects that may require correction, a number of objects and portions thereof to be displayed on a two-dimensional portion of the display regions 302 and 304 (FIGS. 3A-3C), such that the aggregated view may be the same or similar to the original holographic visualization. If the generator 402 identifies a combination of 3D holographic and 2D display content may be required based on the viewing direction and banding angle, then the generator 402 may stitch the 2D and 3D contents so that a user can view similar content during different degrees of folding angle. The generator 402 may also identify the projected display area based on the folding pattern, and accordingly identified how the combination of 2D and 3D image are to be shown.

The generator 402 may read metadata of the holographic content and may accordingly direct the display device 406 to display the 3D holographic content. The generator 402 may determine fold angle measurement and identify the folding angle. Based on the folding angle of the display device, the generator 402 may identify a change in the angular position of the 3D objects. The generator 402 may identify the dimension of the 3D objects and may identify how the 3D objects are displayed. The generator 402 may determine a projected display area and may identify much content will be visible. Based on the current orientation of the 3D holographic object, the generator 402 may identify how much angular change is made and to what extent the angular position may need to be changed. The generator 402 may realign the holographic objects and modify the holographic object shape. The generator 402 may determine how much content is to be displayed in 2D display and cause the display device 406 to display partial content on the 2D display and partial content as a holographic object. It may be appreciated that the generator 402 may direct the display device to display the total object as two-dimensional if required (e.g., the display device is folded at a 90 degree angle).

Figure 5:
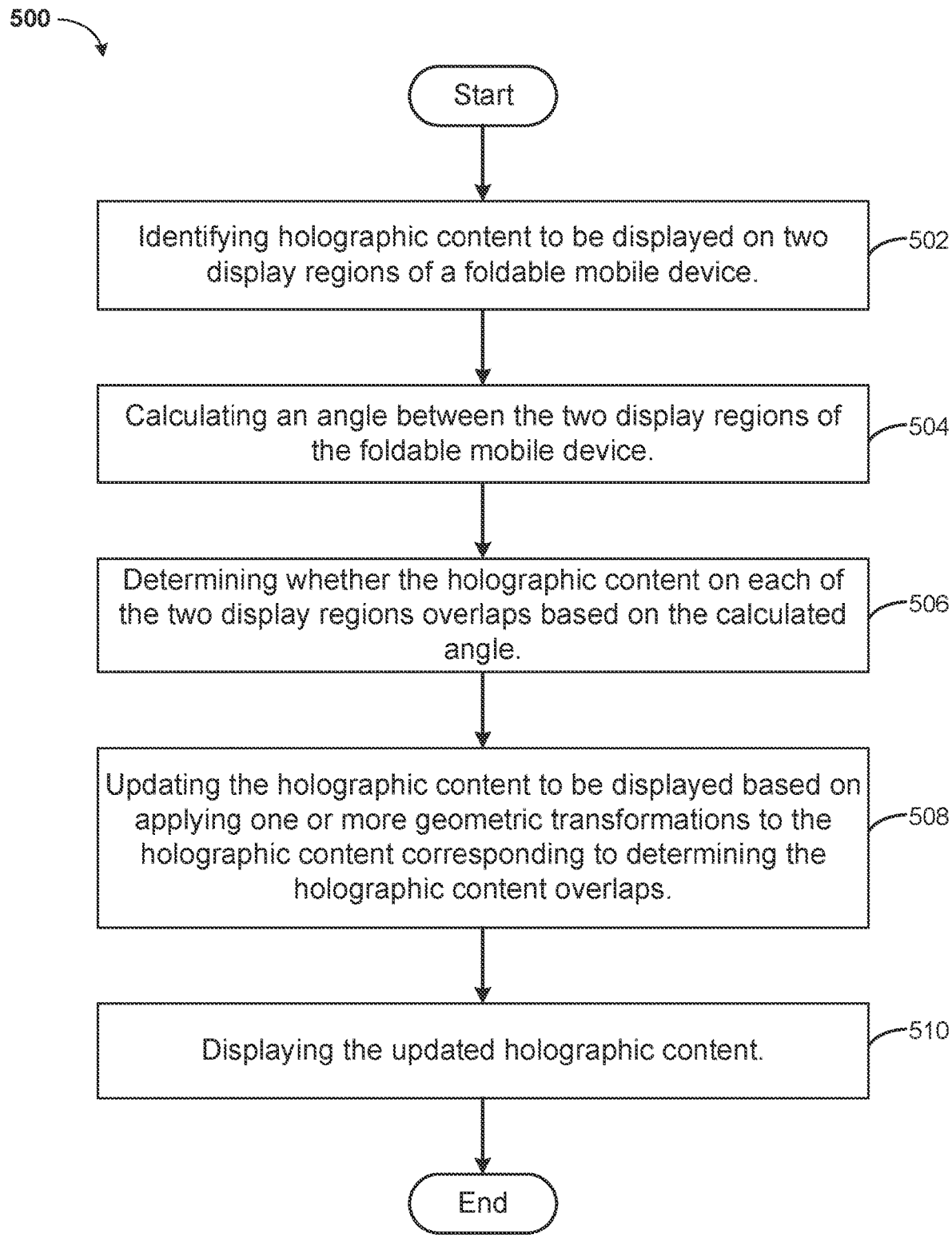
FIG. 5 is an operational flowchart illustrating the steps carried out by a program that corrects holographic content to be displayed on a foldable mobile device, according to at least one embodiment.

Referring now to FIG. 5, an operational flowchart illustrating the steps of a method 500 carried out by a program that corrects holographic content to be displayed on a foldable mobile device is depicted. The method 500 may be described with the aid of the exemplary embodiments of FIGS. 1-3.

At 502, the method 500 may include identifying holographic content to be displayed on two display regions of a foldable mobile device. The holographic content may be 3D content to be displayed in a region outward from the two display regions. In operation, a foldable mobile device may include display regions 302 and 304 (FIGS. 3A-3C) that may display holographic content 306A-C (FIGS. 3A-3C).

The generator 402 (FIG. 4) may identify the holographic content 306A-C within the data 408 (FIG. 4) and may determine on which of the display regions 302 and 304 the holographic content 306A-C is to be displayed.

At 504, the method 500 may include calculating an angle between the two display regions of the foldable mobile device. The angle between the display regions may be determined based on sensor data (e.g., accelerometer) data associated with the display regions. In operation, the display regions 302 and 304 (FIGS. 3A-3C) may each include an accelerometer that the generator 402 (FIG. 4) may use to calculate an angle between the display regions 302 and 304.

At 506, the method 500 may include determining whether the holographic content on each of the two display regions overlaps based on the calculated angle. The determination as to whether the holographic content on each of the two display regions overlaps is performed through a generative neural network that may be trained by providing output data associated with the generative neural network to an adversarial discriminator neural network. In operation, the generator 402 (FIG. 4) may determine that the holographic content 306A-306C (FIG. 3B) overlaps when the display regions 302 and 304 (FIG. 3B) are folded at a given angle. The generator 402 may be trained by the discriminator 404 (FIG. 4).

At 508, the method 500 may include updating the holographic content to be displayed based on applying one or more geometric transformations to the holographic content corresponding to determining the holographic content overlaps. The geometric transformations may also be applied based on a viewing angle associated with the foldable mobile device. The geometric transformations may include a translation, a rotation, and a dilation. In operation, the generator 402 (FIG. 4) may apply geometric transformations to the holographic content 306A-306C (FIG. 3B) in order to display the holographic content 306A-306C (FIG. 3C) without overlap.

At 510, the method 500 may include displaying the updated holographic content. The holographic content may be displayed as a three-dimensional holographic image, or at least a portion of the updated holographic content may be displayed on a two-dimensional portion of the two display regions of the foldable mobile device. In operation, the generator 402 (FIG. 4) may direct the display 406 (FIG. 4) to display the holographic content 306A-C (FIG. 3C) on the display regions 302 and 304 (FIG. 3C).

It may be appreciated that FIG. 5 provides only an illustration of one implementation and does not imply any limitations with regard to how different embodiments may be implemented. Many modifications to the depicted environments may be made based on design and implementation requirements.

Figure 6:
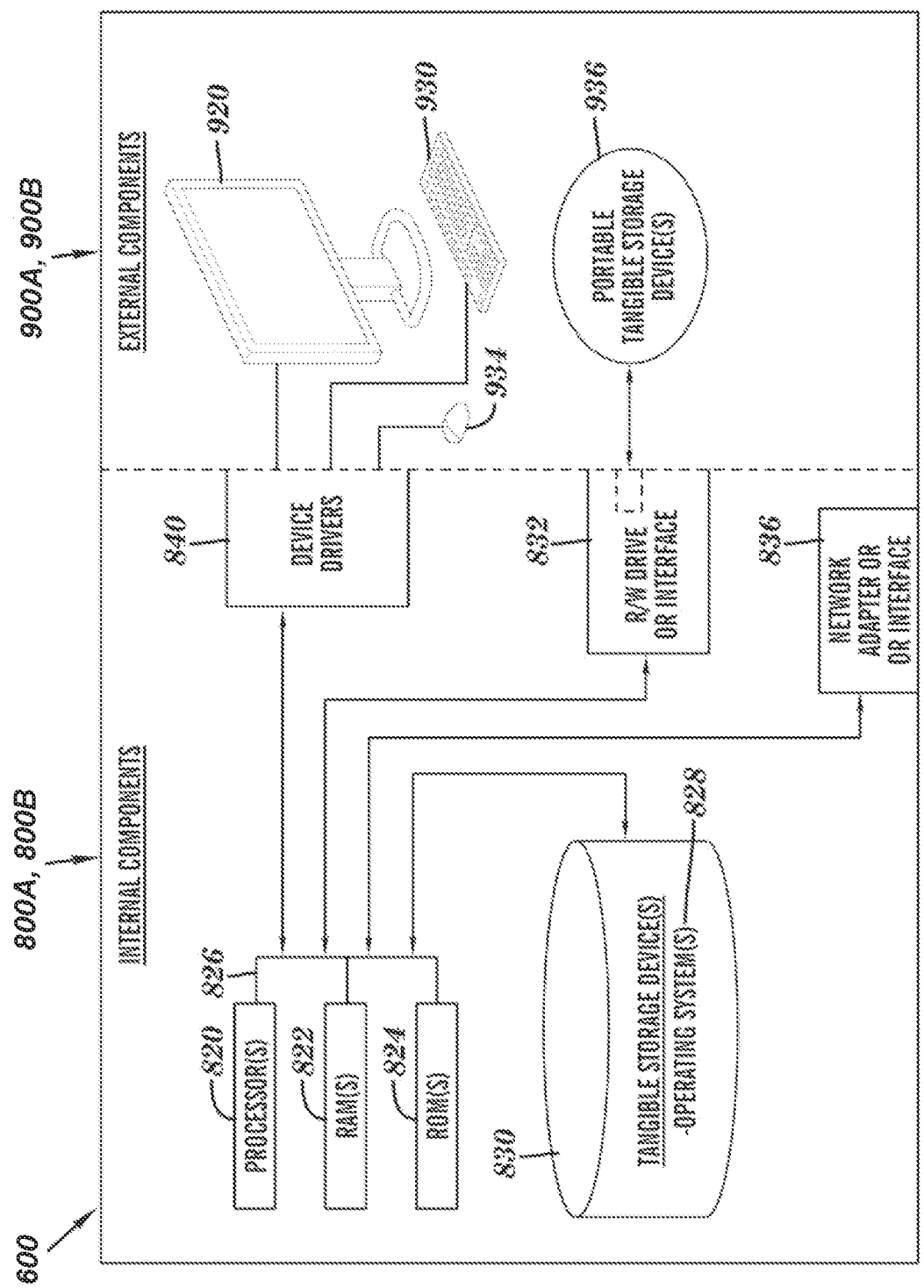
FIG. 6 is a block diagram of internal and external components of computers and servers depicted in FIG. 1 according to at least one embodiment.

FIG. 6 is a block diagram 600 of internal and external components of computers depicted in FIG. 1 in accordance with an illustrative embodiment. It should be appreciated that FIG. 6 provides only an illustration of one implementation and does not imply any limitations with regard to the environments in which different embodiments may be implemented. Many modifications to the depicted environments may be made based on design and implementation requirements.

Computer 202 (FIG. 2) and server computer 214 (FIG. 2) may include respective sets of internal components 800A,B and external components 900A,B illustrated in FIG. 6. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. The one or more buses 826 include a component that permits communication among the internal components 800A,B.

The one or more operating systems 828, the software program 108 (FIG. 2) and the Holographic Image Correction Program 216 (FIG. 2) on server computer 214 (FIG. 2) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid-state disk, a compact disc (CD), a digital versatile disc (DVD), a floppy disk, a magnetic tape, and/or another type of non-transitory computer-readable tangible storage device that can store a computer program and digital information.

Each set of internal components 800A,B also includes a RAY drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 2) and the Holographic Image Correction Program 216 (FIG. 2) can be stored on one or more of the respective portable computer-readable tangible storage devices 936, read via the respective RAY drive or interface 832 and loaded into the respective computer-readable tangible storage device 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 2) and the Holographic Image Correction Program 216 (FIG. 2) on the server computer 214 (FIG. 2) can be downloaded to the computer 202 (FIG. 2) and server computer 214 from an external computer via a network (for example, the Internet, a local area network or other, wide area network) and respective network adapters or interfaces 836. From the network adapters or interfaces 836, the software program 108 and the Holographic Image Correction Program 216 on the server computer 214 are loaded into the respective computer-readable tangible storage device 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in computer-readable tangible storage device 830 and/or ROM 824).

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of correcting holographic content to be displayed on a foldable mobile device, executable by a processor, comprising:
identifying holographic content to be displayed on two display regions of a foldable mobile device;
calculating an angle between the two display regions of the foldable mobile device;
determining whether the holographic content on each of the two display regions overlaps based on the calculated angle; and
updating the holographic content to be displayed based on applying one or more geometric transformations to the holographic content corresponding to determining the holographic content overlaps.

2. The method of claim 1, further comprising displaying the updated holographic content as a three-dimensional holographic image.

3. The method of claim 1, further comprising displaying at least a portion of the updated holographic content on a two-dimensional portion of the two display regions of the foldable mobile device.

4. The method of claim 1, wherein the geometric transformations comprise a translation, a rotation, and a dilation.

5. The method of claim 1, wherein the determination as to whether the holographic content on each of the two display regions overlaps is performed through a generative adversarial network.

6. The method of claim 5, wherein the generative neural network is trained by providing output data associated with the generative neural network to an adversarial discriminator neural network.

7. The method of claim 1, wherein the geometric transformations are applied based on a viewing angle associated with the foldable mobile device.

8. A computer system for correcting holographic content to be displayed on a foldable mobile device, the computer system comprising:
one or more computer-readable non-transitory storage media configured to store computer program code; and
one or more computer processors configured to access said computer program code and operate as instructed by said computer program code, said computer program code including:
identifying code configured to cause the one or more computer processors to identify holographic content to be displayed on two display regions of a foldable mobile device;
calculating code configured to cause the one or more computer processors to calculate an angle between the two display regions of the foldable mobile device;
determining code configured to cause the one or more computer processors to determine whether the holographic content on each of the two display regions overlaps based on the calculated angle; and
updating code configured to cause the one or more computer processors to update the holographic content to be displayed based on applying one or more geometric transformations to the holographic content corresponding to determining the holographic content overlaps.

9. The computer system of claim 8, further comprising displaying code configured to cause the one or more computer processors to display the updated holographic content as a three-dimensional holographic image.

10. The computer system of claim 8, further comprising displaying code configured to cause the one or more computer processors to display at least a portion of the updated holographic content on a two-dimensional portion of the two display regions of the foldable mobile device.

11. The computer system of claim 8, wherein the geometric transformations comprise a translation, a rotation, and a dilation.

12. The computer system of claim 8, wherein the determination as to whether the holographic content on each of the two display regions overlaps is performed through a generative neural network.

13. The computer system of claim 12, wherein the generative neural network is trained by providing output data associated with the generative neural network to an adversarial discriminator neural network.

14. The computer system of claim 8, wherein the geometric transformations are applied based on a viewing angle associated with the foldable mobile device.

15. A non-transitory computer readable medium having stored thereon a computer program for correcting holographic content to be displayed on a foldable mobile device, the computer program configured to cause one or more computer processors to:

identify holographic content to be displayed on two display regions of a foldable mobile device;

calculate an angle between the two display regions of the foldable mobile device;

determine whether the holographic content on each of the two display regions overlaps based on the calculated angle; and update the holographic content to be displayed based on applying one or more geometric transformations to the holographic content corresponding to determining the holographic content overlaps.

16. The computer readable medium of claim 15, wherein the computer program is further configured to cause the one or more computer processors to display the updated holographic content as a three-dimensional holographic image.

17. The computer readable medium of claim 15, wherein the computer program is further configured to cause the one or more computer processors to display at least a portion of the updated holographic content on a two-dimensional portion of the two display regions of the foldable mobile device.

18. The computer readable medium of claim 15, wherein the geometric transformations comprise a translation, a rotation, and a dilation.

19. The computer readable medium of claim 15, wherein the determination as to whether the holographic content on each of the two display regions overlaps is performed through a generative neural network.

20. The computer readable medium of claim 19, wherein the generative neural network is trained by providing output data associated with the generative neural network to an adversarial discriminator neural network.

\* \* \* \* \*